(No Model.) 2 Sheets—Sheet 1.

H. V. PARSELL & H. V. PARSELL, Jr.
PHOTOGRAPHIC CAMERA.

No. 316,647. Patented Apr. 28, 1885.

WITNESSES:
Donn Twitchell
C. Sedgwick

INVENTOR:
H. V. Parsell
H. V. Parsell, Jr.
BY Munn & Co
ATTORNEYS.

(No Model.) 2 Sheets—Sheet 2.

H. V. PARSELL & H. V. PARSELL, Jr.
PHOTOGRAPHIC CAMERA.

No. 316,647. Patented Apr. 28, 1885.

WITNESSES:
Donn Twitchell
C. Sedgwick

INVENTOR:
H. V. Parsell
H. V. Parsell Jr.
BY Munn & Co.
ATTORNEYS.

UNITED STATES PATENT OFFICE.

HENRY V. PARSELL AND HENRY V. PARSELL, JR., OF NEW YORK, N. Y.

PHOTOGRAPHIC CAMERA.

SPECIFICATION forming part of Letters Patent No. 316,647, dated April 28, 1885.

Application filed January 31, 1885. (No model.)

*To all whom it may concern:*

Be it known that we, HENRY V. PARSELL and HENRY V. PARSELL, Jr., of the city, county, and State of New York, have invented a new and Improved Photographic Camera, of which the following is a full, clear, and exact description.

This invention, while including certain peculiar constructions of details and combinations of parts applicable to photographic cameras generally, is more especially designed to be applied to portable camera boxes or cases capable of being used without a tripod or stand, the reasons for which are numerous, but in this connection it will be sufficient to state that it is often desirable—as, for instance, in the taking of children, animals, and other persons or living objects without their knowledge or consent—to have the photographer's apparatus concealed. To this end, and to make the instrument so light that it can be readily carried in the hand, the form which we prefer to use is that of a rectangular box covered with leather and buttons, to resemble as nearly as possible a small valise or medicine-box, so that the outward appearance of the apparatus may have no resemblance to a photographic camera. To carry out this design, the box may be provided with a flexible leather handle at one side, by which it may be easily carried.

The invention comprises an arrangement, in a compact form, of a lens-tube, an adjustable reflector and supplementary focusing-lens, a shutter, and a receptacle for plates, to permit of the whole being carried in a portable manner, as above described, and to permit of an easy and rapid way of exposing and taking negatives; and the invention also consists in special constructions and combinations of these and other parts connected with them, substantially as hereinafter described.

Figure 1:
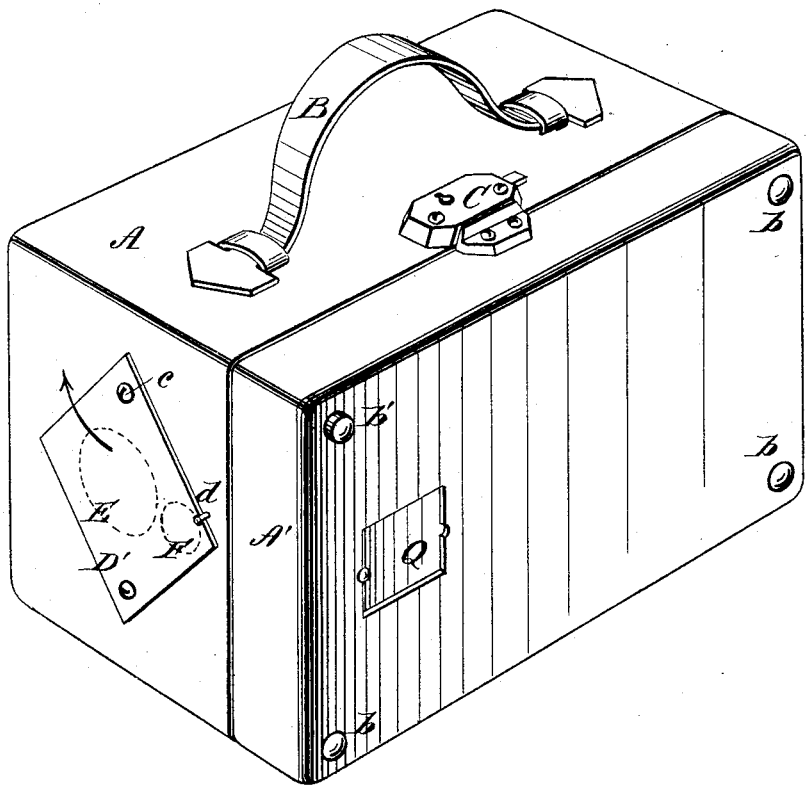
Figure 2:
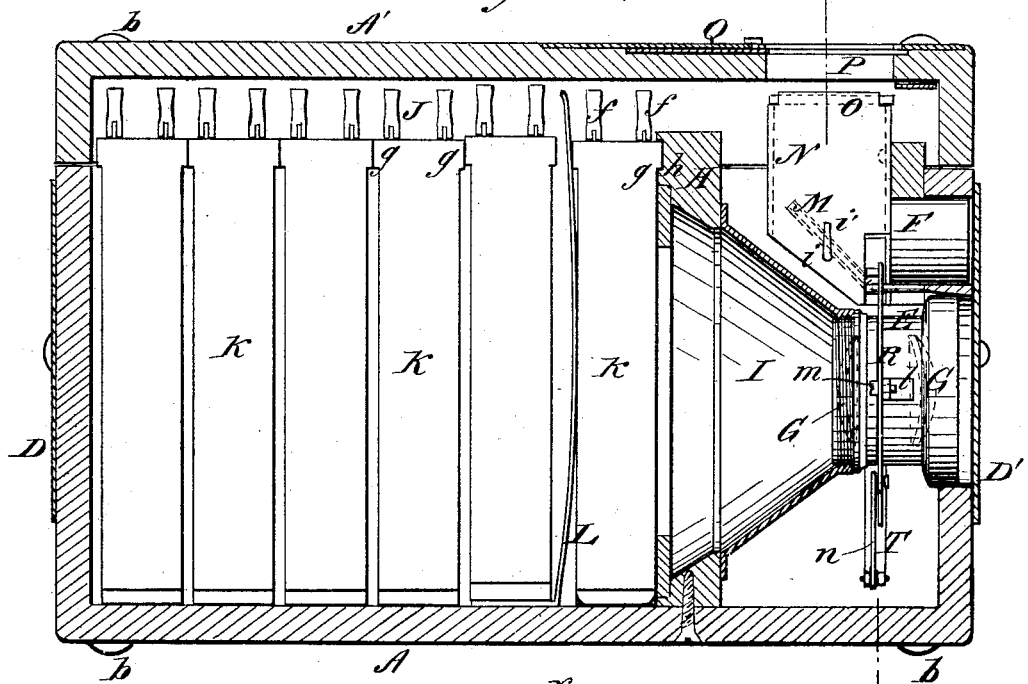
Figure 3:
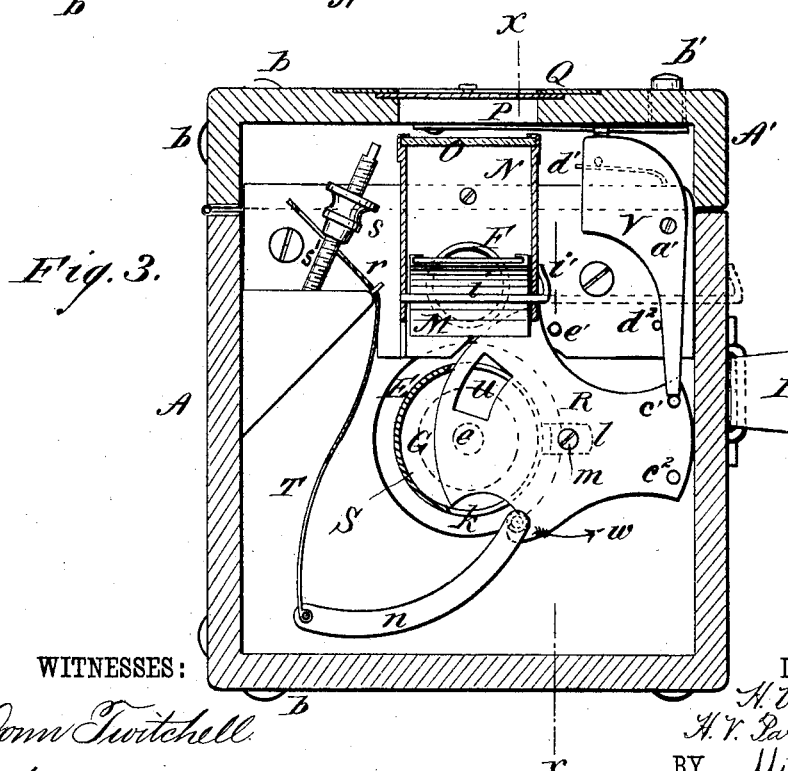

Figure 1 represents a view in perspective of a photographic camera box or case embodying our invention, showing the same in the form which we have hereinbefore stated that we prefer. Fig. 2 is a vertical, partly sectional, longitudinal view mainly on the line *x x* in Fig. 3 of the same; and Fig. 3 a vertical transverse section mainly on the line *y y* in Fig. 2.

A A' is a box or case, of rectangular shape, and made in the form of a small valise or portable medicine-box, A indicating the body of the case, and A' its hinged lid; B, a flexible or other handle by which to carry the case; C, its lock; and *b b'*, buttons on the surface of the leather which covers the case, resembling nail-heads, to more perfectly carry out the deception as to the character of the case as regards its being a small valise or portable medicine-box, and the one of which buttons, *b'*, is made available in the operation of the instrument. Furthermore, each end of the body of the case has a face-piece, D D', of similar shape, to further conceal the character of the case, and the one, D, of which is a mere re-enforcing piece, while the other, D', is an outside cap or swinging lid to the main lens-tube, pivoted as at *c*, and closing against a stop, *d*, and serving, when closed, to cover both the outside opening to the main lens-tube E and to the tube F of a "finder," which should be provided with a lens such as is ordinarily used in finders for throwing the image onto a mirror, from which it is reflected onto the ground glass of the finder, for the purpose of sighting and properly placing the object to be photographed on the sensitive plate.

The apparatus is designed more especially for taking pictures instantaneously by means of a special shutter; but it includes special constructions of parts, whereby time as well as instantaneous exposures may be made. We prefer to use a short focus-lens of the wide-angle type placed at a fixed focus with reference to the sensitive plate.

G G represent the lenses within the tube E, having between them either a concentrically-arranged diaphragm, S, having a central aperture, *e*, or an ordinary eccentrically-arranged rotary diaphragm provided with a series of different-sized apertures outside of its center, but crossing the focusing-axis of the lenses. By thus employing a short focus-lens additional space is allowed in the box for carrying or holding plate-holders. The frame H, forming the back of the camera proper, and attached to the back or larger end of the cone I, which also connects with the lens-tube E, serves to separate the larger portion of the box into a chamber, J, for holding a series of plate-holders, K, one in the rear of the other. The lenses will be usually arranged to sharply focus objects at a distance of from six to fifty feet, more or less, from the camera. By using a fixed focus we avoid the necessity of a flexible bellows, and are thereby enabled to construct a simple and strong camera. The design, however, which we have specified for the camera may be varied when necessary by substituting the usual bellows and sliding bed for the metal or opaque cone I. The plate-holders K may be of the ordinary or any suitable construction, with double slides $f\ f$, for holding two sensitive plates within them, and each of said holders has a shoulder, $g$, on its upper end for interlocking with a groove, $h$, in and forming a close light-tight joint with the frame H when the holder is introduced between said frame and the springs L, which force the holder up against the frame.

M is the reflecting-mirror inclosed in the metal or other box N of the finder-tube F; O, the ground glass of the finder; and P, a sight-opening in the top of the box for observing the reflection of the image on the ground glass and closed when not required to be used by a slide, Q. The mirror M is pivoted intermediately of its length or width, as by a pivot or cross-spindle, $i$, of spring construction at its one end, $i'$, to bear against the one side of the box N for holding the mirror in any desired angular position, or the spindle $i$ may be extended, as shown by dotted lines in Fig. 3, and its spring end $i'$, which also forms a handle to turn the mirror, be arranged to bear on the outside of the box or case A. The mirror thus hung may readily be turned to suit any angle to which the camera may be set, thereby throwing the picture distinctly upon the ground glass of the finder in order that the position of a moving image may be easily seen.

R is the shutter of the camera. This shutter is arranged between the lenses G G, so as to cover the diaphragm $e$. By thus arranging the shutter between the lenses, either in front of or behind the diaphragm and adjacent thereto, several advantages are obtained, owing to the fact that less motion is required for the shutter at this point, and that the picture is more equally flashed upon the sensitive plate. We have accordingly made a slit, $k$, in the lens-tube E adjacent to the diaphragm halfway or partially through the tube, and on one side of said tube have fastened, by soldering, screwing, or otherwise to the lens-tube a projection or lug, $l$, to which the shutter R is pivoted at $m$. This shutter, which may be a thin metal one, is made to turn or revolve in a quarter-circle by means of a link, $n$, pivoted to the bottom edge of the shutter, and a flat propelling steel spring, T, connected therewith. Said spring, which has its fulcrum at $r$, has its tension regulated by a screw-nut, $s$, arranged to fit a screw-pin, $s'$, and to bear against a free back extension of the spring beyond its fulcrum. This forms a very simple and efficient means of regulating the tension of the spring. The shutter moves in the direction of the arrow $w$ when released, and thereby allows the image to pass through the lens when aperture U of the shutter coincides with the diaphragm-aperture $e$ in the lens-tube, and is released or held closed, when required, by a trigger, V. This trigger is in the form of a lever, pivoted at $a'$, and holds the shutter closed by its lower arm or leg engaging with or bearing against one or other of two pins or projections, $c'\ c^2$, on the back arm of the shutter, the upper pin, $c'$, being used when taking an instantaneous picture, and the lower pin, $c^2$, when making a time-exposure. The trigger is held to its locking-position on the shutter by a spring, $d'$, and stop $d^2$, and is operated to release the shutter by pressing upon the button $b'$ that is carried by a spring and projects through the lid or cover of the box. When released, the shutter is arrested at the termination of its stroke by striking a pin or stop, $e'$. The lower pin, $c^2$, on the shutter, when engaged with the lower end of the trigger V, holds the opening $u$ in the shutter opposite the diaphragm-aperture $e$, thereby permitting a time-exposure to be made when the cap D' is opened or pushed to one side for the purpose. The said exposure may be stopped by either pushing the cap D' back to its original position or by pressing upon the button $b'$, which, in disengaging the pin $c^2$ on the shutter from the trigger V, allows the shutter to quickly close. When the trigger V is engaged with the pin $c'$, the shutter is closed, and it is only when the opening U in the shutter, after it is released, passes the diaphragm-opening $e$ that an instantaneous exposure is made.

It will be observed that the reflector M of the finder is pivoted intermediately of its height, whereby it is or may be balanced, and is thereby restrained from shifting or dropping by gravity after it has been adjusted, and may be much more nicely and easily adjusted than if pivoted at its upper end.

Having thus fully described our invention, we claim as new and desire to secure by Letters Patent—

1. The swinging apertured shutter R for controlling the main lens-tube, in combination with the link $n$, the spring T, and the trigger V, arranged for operation in connection with duplicate stops $c'\ c^2$ on the shutter, for giving a "time" or an instantaneous exposure of the sensitive plate, as desired, substantially as specified.

2. The combination, with the swinging shutter that controls the main lens-tube, of the spring T, for actuating the shutter, the intermediate fulcrum, $r$, to said spring, and the tension-regulating nut $s$, arranged to bear on or against a backward extension of the spring, substantially as described.

3. The combination of the spring-button $b'$, the trigger V, and the spring-actuated shutter R, having duplicate stops $c'\ c^2$, essentially as described.

4. In the finder of a photographic camera, the adjustable reflector M, pivoted intermediately at its height to vary its angle relatively to the tube and ground glass of the finder, and whereby said reflector is or may be balanced and be restrained from shifting or dropping by gravity, and be more readily adjusted, substantially as specified.

5. In combination with the box N of the finder, its ground glass O, lid or slide Q, and tube F, the angularly-adjustable mirror M, provided with a pivot, i, constructed to form a spring for holding said mirror when adjusted, essentially as described.

6. In a camera-box provided with a finder-tube, the pivoted and swinging cap D', arranged to control both the main lens-tube and finder-tube, essentially as described.

HENRY V. PARSELL.
    HENRY V. PARSELL, JR.

Witnesses:
 C. SEDGWICK,
 EDWARD M. CLARK.